United States Patent Office 3,175,994

Patented Mar. 30, 1965

3,175,994

PROCESS FOR PREPARING ORGANOPOLYSILOXANES

Arthur Katchman and Glenn D. Cooper, Schenectady, N.Y., assignors to General Electric Company, a corporation of New York No Drawing. Filed Apr. 6, 1962, Ser. No. 185,513
15 Claims. (Cl. 260—46.5)

This invention relates to a process for making organopolysiloxanes. More particularly, the invention is concerned with a process for making soluble organopolysiloxanes containing an average of from 1.0 to 1.1 silicon-bonded organic groups per silicon atom and composed of from 90 to 100 mol percent of organosiloxy units of the formula (I) $$RSiO_{3/2}$$

and having an intrinsic viscosity in benzene at 25° C. of at least 0.4 deciliter per gram, where R is an aryl radical and the remaining organosiloxy units, if any, being selected from a class of organosiloxy units hereinafter described, which process comprises heating a prepolymer containing the aforesaid organosiloxy units in the presence of a basic condensation and rearrangement catalyst (hereinafter referred to as "basic catalyst") and an organosulfur compound (hereinafter so designated) selected from the class consisting of alkyl sulfones and alkyl sulfoxides in which the total number of carbon atoms is at most four, as, for example, compounds represented by the formula QXQ where Q is either the methyl or ethyl radical and X represents a member selected from the class consisting of a

 and 

radical, e.g., dimethyl sulfoxide, diethyl sulfoxide, methyl ethyl sulfoxide, dimethyl sulfone, diethyl sulfone, and methyl ethyl sulfone; other alkyl sulfones and sulfoxides included are e.g., tetramethylene sulfone, tetramethylene sulfoxide, etc.

In U.S. Patent 3,017,386 of John F. Brown, Jr. and Lester H. Vogt, issued January 16, 1962, and assigned to the same assignee as the present invention, there are disclosed and claimed methods for making organopolysiloxanes having intrinsic viscosities in benzene at 25° C. of at least 0.4 deciliter per gram, where the organopolysiloxanes are composed of from 90 to 100 mol percent of organosiloxy units of the formula $RSiO_{3/2}$ and any remaining organosiloxy units of the organopolysiloxane being selected from the class consisting of organosiloxy groups of the formula $R'R''SiO$, $R'[CN-(CH_2)_m]SiO$, $R'''SiO_{3/2}$, and $CN(CH_2)_mSiO_{3/2}$ groups, where R is an aryl radical (e.g., phenyl, cyanophenyl, benzylphenyl, tolyl, xylyl, ethylphenyl, naphthyl, biphenyl, anthracyl, phenoxyphenyl, tolyloxyphenyl, etc., radicals); R′ and R″ are selected from the class consisting of aryl radicals (many examples of which have been given above), alkyl radicals (e.g., methyl, ethyl, propyl, isopropyl, butyl, cyclopentyl, cyclohexyl, etc., radicals); and alkenyl radicals (e.g., vinyl, allyl, methallyl, cyclohexenyl, etc. radicals); R‴ is a lower alkyl radical of from 1 to 4 carbon atoms, for instance, methyl, ethyl, propyl, butyl, etc. radicals; and *m* is a whole number equal to from 2 to 4. Mixtures of these radicals are also contemplated.

The preparation of these organopolysiloxanes is carried out in the presence of a suitable solvent in preferred concentrations using a basic catalyst, e.g., an alkali-metal hydroxide or silanolate, for converting the prepolymer to a higher molecular weight composition. It generally has been found that in order to obtain rapid conversion of the prepolymer to the final polysiloxane state, it is necessary to use relatively high temperatures of the order of about 175° C. and preferably from 200 to 300° C. Even at these elevated temperatures, it is often difficult to attain higher intrinsic viscosities of the final polysiloxane composition without excessive heating. If temperatures substantially below 200° C. are employed, the times of reaction are significantly increased and the intrinsic viscosity of the final product usually is quite low.

Unexpectedly, we have discovered that we can accelerate the conversion of the organopolysiloxane prepolymer to the final polysiloxane state of increased molecular weight by employing in the reaction mixture, preferably though not essentially, a minor proportion of the aforesaid organosulfur compound. The presence of even small amounts of the organosulfur compound, e.g., from about 0.5 to 15 percent, by weight, based on the weight of the organopolysiloxane prepolymer, markedly affects this rate of reaction. However, after a certain level, we have found that the intrinsic viscosity does not benefit by excessive amounts of the organosulfur compound, and in some respects the intrinsic viscosity will decrease samewhat.

It is accordingly one of the objects of this invention to prepare benzene-soluble organopolysiloxane polymers at a more enhanced rate than has heretofore been possible under similar conditions.

It is a further object of this invention to prepare organopolysiloxane polymers of intrinsic viscosity of 0.4 or higher at a lower temperature without undue sacrifice of either the intrinsic viscosity or time of attainment of such intrinsic viscosity.

Other objects of the invention will become more apparent from the discussion which follows.

The above-described intrinsic viscosities (identified by the symbol "[$\eta$]" or "$\eta$") referred to herein as a measurement of the molecular weight of the polymers prepared in accordance with our invention were determined pursuant to the method described in the aforesaid U.S. Patent 3,017,386—Brown et al.

The prepolymer, which term is intended to cover both homopolymers or copolymers and which preferably but not essentially is free of silicon-bonded hydroxy groups, can be made by any one of several methods. Thus, in the preparation of, for instance, the prepolymer from an aryl trihydrolyzable silane, for instance, phenyl trichlorosilane, one method comprises hydrolyzing the latter which water in an amount sufficient to effect complete hydrolysis of the silicon-bonded hydrolyzable groups, advantageously employing a solvent such as benzene, toluene, xylene, diethyl ether, etc., as a diluent for the hydrolysis medium. The acid layer is removed and the resin layer (washed free of acid), which is advantageously in the form of an aromatic hydrocarbon solution, is treated, for instance, by azeotropic distillation, to remove any of the residual water and HCl.

When preparing precopolymers composed of at least 90 mol percent of monophenylsiloxy units with either diphenylsiloxy units or siloxy units containing from 1 to 2 organic groups selected from the class consisting of alkyl, alkenyl, and cyanoalkyl radicals within the range of 10 mol percent or less, there are several means for accomplishing this. One method comprises cohydrolyzing and aryltrihydrolyzable silane with the requisite molar amount of either a diaryldihydrolyzable silane or a hydrolyzable silane of the formula $$Z_mSiY_{4-m}$$

where Z is a lower alkyl radical, alkenyl radical, or cyanoalkyl radical of from 2 to 4 carbon atoms (exclusive of the —CN radical), and Y is a hydrolyzable group, for example, halogen (e.g., chlorine, bromine, etc.), an organoxy radical (e.g. ethoxy, aryloxy, etc. radical), acyloxy, etc., and $m$ is an integer of from 1 to 2, inclusive.

When making copolymers for the prepolymer stage by the cohydrolysis of the aryltrihydrolyzable silane with the one or more cohydrolyzable silanes conforming to the above-described organic types and number of substituents on the silicon, the condition for hydrolysis are generally well known in the art and of course include the use of an amount of water sufficient to effect complete hydrolysis of all silicon-bonded hydrolyzable groups. The use of inert solvents in carrying out this hydrolysis, for instance, benzene, toluene, xylene, etc., is shown in such United States Patents as, e.g., 2,504,839—Hyde; 2,456,-627—Doyle; 2,470,497—Lamoreaux; and 2,383,827—Sprung.

Instead of effecting cohydrolysis of the aryltrihydrolyzable silane in combination with the other hydrolyzable silanes, one can effect interpolymerization between the aryl prepolymer obtained from the aryltrihydrolyzable silane with organopolysiloxanes already having the other desired organic groups, i.e., diaryl siloxanes, siloxanes containing from 1 to 2 lower alkyl or cyanoalkyl radicals on each silicon atom, etc. For instance, the prepolymer from the phenyltrihydrolyzable silane can be interreacted under heat with octamethylcyclotetrasiloxane, octaphenylcyclotetrasiloxane, tetramethyltetraphenylcyclotetrasiloxane, or with tetramethyltetracyanoalkylcyclotetrasiloxane, for instance, tetramethyltetra(beta-cyanoethyl)cyclotetrasiloxane, in the presence of a suitable solvent, such as toluene, employing an alkaline rearrangement catalyst, for effecting interpolymerization. The heating is advantageously carried out to a point where the reaction product is substantially free of silicon-bonded hydroxyl groups. This stage is desirable not only when making the precopolymers but also when making the prepolymers with the aryl trihydrolyzable silanes, for instance, the prepolymer derived from the hydrolyzate of phenyltrichlorosilane.

As specific examples of monomeric silanes which can be hydrolyzed and cohydrolyzed and polymeric siloxanes which can be copolymerized in order to make the prepolymers which are subsequently treated at elevated temperatures in the presence of the rearrangement catalyst in the requisite solvent at the concentration required to obtain polymers with intrinsic viscosities within the scope of our invention, one can mention as the monomeric silanes, for instance, the hydrolyzates of phenyltrichlorosilane; biphenyltrichlorosilane; naphthyltriethoxysilane; tolyltriacetoxysilane; anthracyl trichlorosilane, etc.

Among the cohydrolyzates which may be prepared in accordance with the above general instructions may be mentioned, for instance, the cohydrolysis of phenyltrichlorosilane and diphenyldichlorosilane; the cohydrolysis of phenyltrichlorosilane and methyltrichlorosilane; the cohydrolysis of phenyltrichlorosilane and beta-cyanoethyltrichlorosilane; the cohydrolysis of phenyltrichlorosilane and dimethyldichlorosilane; the cohydrolysis of phenyltrichlorosilane and methyl beta-cyanotheyldichlorosilane; the cohydrolysis of biphenyltriethoxysilane and diphenyldiethoxysilane; the cohydrolysis of naphthyltrichlorosilane and dimethyldichlorosilane; cohydrolysis of phenyltriethoxy silane and isopropyltriethoxysilane; cohydrolysis of phenyltriethoxysilane and methyl vinyldiethoxysilane, etc. The use of ternary cohydrolysis reactants is not precluded, as for instance a ternary mixture of phenyltrichlorosilane, methyltrichlorosilane, and beta-cyanoethyl methyldichlorosilane; phenyltrichlorosilane, dimethyldichlorosilane and methyl phenyldichlorosilane, etc. It should, of course, be understood that when cohydrolyzing two or more cohydrolyzable ingredients including the monoaryltrihydrolyzable silane, the hydrolyzable silanes other than the latter monoaryltrihydrolyzable silane should be present in molar concentrations of 10 mol percent or less of the total molar concentration of all the hydrolyzable silanes.

Included among the organopolysiloxanes which can be used in making copolymerized prepolymers can be mentioned, for instance, the monoarylpolysiloxanes in combination with one or more of the following, for instance, octaphenylcyclotetrasiloxane, octamethylcyclotetrasiloxane, tetramethyltetraphenylcyclotetrasiloxane, octaethylcyclotetrasiloxane, decamethylcyclopentasiloxane, the hydrolyzate of methyltrichlorosilane, tetramethyl tetra(beta-cyanoethyl)cyclotetrasiloxane, tetramethyltetravinylcyclotetrasiloxane, etc. It will again be understood that in effecting copolymerization of the siloxanes, there will be employed for coreaction with the hydrolyzate of the aryltrihydrolyzable silane, molar quantities of the other organosiloxane or siloxanes which do not exceed 10 mol percent of the total molar concentration of the ingredients.

For interpolymerization of the organopolysiloxanes described immediately above, one can employ from about 0.001 to about 2%, by weight, based on the weight of the organopolysiloxane undergoing treatment of a basic catalyst, for instance, potassium hydroxide, cesium hydroxide, tetramethyl ammonium hydroxide, tetrabutyl phosphonium hydroxide, etc. The temperature at which the interaction for making the prepolymer is carried out may vary from about 75 to 175° C. or higher, for times of the order of from about 10 minutes to about 20 hours or more. Generally, the heating is continued until the prepolymer is substantially free of silicon-bonded hydroxyl groups. Solvents are advantageously employed in this copolymerization reaction. It should be noted that if the molar concentrations of organosiloxy units, other than the monoarylsiloxy unit, approach or exceed 10 mol percent, in the final polymer prepared in accordance with our invention, the intrinsic viscosity will generally fall below 0.4.

The preparation of organopolysiloxane compositions having intrinsic viscosity of at least 0.4 or higher is accomplished by first mixing the prepolymer more particularly described above with a suitable solvent or mixture of suitable solvents in such an amount that the percentage of solvent in the final condensed phase, that is, at the time the final reaction or conversion of the prepolymer to the polysiloxane state is carried out, is less than 30% by weight of the total weight of the prepolymer in the solvent. Thus, it is possible to start with an amount of solvent of 30% or less, by weight, and carry out the reaction as disclosed further, or else a solvent or mixture of solvents can be employed in an amount in excess of 30%, by weight, as more particularly disclosed and claimed in the copending application of Arthur Katchman and Kenneth M. Kiser, Serial No. 175,286, filed February 23, 1962, and assigned to the same assignee as the present invention. By reference, this latter application is incorporated into the disclosures of the instant application. Generally the solvent concentration may range on a weight basis from about 0.05 to 10 parts of the solvent (or mixture of solvents) per part of the prepolymer. It is generally desirable though not essential, to add the basic catalyst at this point for solubility reasons. Additional solubility of the basic catalyst can be obtained by making alcohol derivatives thereof such as the methanol derivatives of the basic rearrangement catalyst, for instance, the methanol derivative of potassium hydroxide. Alternatively, the prepolymer may already have the catalyst present as a result of the same catalyst or different basic catalyst being used to make the prepolymer, in which case the residual catalyst in the prepolymer may be sufficient to prepare the final organopolysiloxane of increased molecular weight.

Thereafter, the mixture of the prepolymer and the solvent is heated at a temperature sufficiently high to remove from contact with the prepolymer the desired amount of solvent (if the process described in the aforesaid Katchman and Kiser application is employed using an excess of solvent) so that the remaining solvent in contact with the prepolymer is less than 30%, by weight, of the total weight of the prepolymer in the remaining solvent. If, however, an amount of solvent is initially used which is at or below 30 weight percent, and no further removal of solvent is desired in order to obtain the desired intrinsic viscosity, then the reaction can be caused to take place without further alteration of conditions. Thereafter, the mixture of ingredients is advantageously heated at the elevated temperatures required for the purpose under such conditions (such as in a closed system or using a sealed reaction vessel) that no further solvent loss is allowed in accordance with the desired intrinsic viscosity, keeping in mind that any total loss of solvent may be based on the formula $$\text{(II)} \qquad \eta=0.045(M/X)^{1.4}$$

recited in the above Katchman and Kiser application where $\eta$ is the desired intrinsic viscosity, X is the weight of the solvent in the condensed phase, and M is the weight of the prepolymer.

Among the solvents which may be employed in the practice of our invention, and which preferably should be substantially inert to the basic catalyst and should not deplete the catalyst concentration, or interact with the prepolymer or with the final organopolysiloxane, may be mentioned, for instance, diphenyl, diphenyl oxide, mixtures of the latter two ingredients (e.g., Dowtherm A sold by Dow Chemical Company, Midland, Michigan), methyl phenyl ether, ethyl phenyl ether, cyclohexane, mesitylene, durene, benzene, toluene, xylene, meta-dimethoxybenzene, pyridine, pyrrole, 4-picoline, 2,6-lutidine, fluorobenzene, dibenzofuran, etc., as well as mixtures of these solvents.

Once the solvent in which the conversion of the prepolymer is adjusted to the necessary concentration level pursuant to the desired intrinsic viscosity, the prepolymer, the basic catalyst, and the organosulfur compound (which can be added at any stage prior to effecting reaction) are heated to convert the prepolymer to the higher intrinsic viscosity state (hereinafter called the "polymer"). The temperature at which the heating can take place may vary widely. Thus, temperatures of the order of about 125° to 325° C. may be used, depending on the solvent employed, the type of prepolymer, the concentration of the basic catalyst, the concentration of the organosulfur compound, etc.

The rearrangement and condensation basic catalyst which may be used includes some of those employed in making the prepolymer i.e., alkali-metal hydroxides, alkali-metal silanolates, for instance, the potassium salt of methylsilanetriol, the potassium salt of phenylsilanetriol, etc., either alone or in the form of an alcohol, for instance, a methanol solution, etc. The amount of basic catalyst used in converting the prepolymer to the higher intrinsic viscosity composition may also be varied widely, but advantageously is within the range of from about 0.0005 to about 0.5 percent or more, by weight, based on the weight of the prepolymer undergoing treatment.

The time of heating (which may be at normal or superatmospheric pressures) may be varied widely and will depend upon such factors as, for example, the prepolymer undergoing reaction, the basic catalyst used, the catalyst concentration, the particular solvent, solvent concentration, amount of organosulfur compound, etc. Generally, times on the order of about 30 minutes to 20 hours or more are sufficient to obtain the desired intrinsic viscosity. More careful control should be exercised in the case of the prepolymer containing silanol groups than in the case where the prepolymer is free of silanol groups in order to avoid gelation. However, by maintaining the concentration of solvent constant in accordance with the formula recited above, the danger of gelation is materially eliminated. It will be found that the presence of the organosulfur compound in the reaction mixture will aid in reducing significantly the time required to attain the desired intrinsic viscosity under otherwise equivalent conditions as compared to that case where the organosulfur compound is omitted.

Although it is not intended to be restricted to any theoretical considerations, it is believed that the polymers obtained in accordance with the practice of our invention, are generally of a linear nature which would account for the soluble characteristics. Flow birefringence and light scattering data indicate that the molecule is a large randomly coiled linear molecule. Infrared data point to the presence of linear polysiloxane chains and unstrained cyclotetrasiloxane rings. From this data it is believed that the polymers may be composed of a large number of linearly arranged siloxy units of the formula

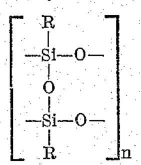

where R is an aryl radical, many examples of which have been given above and $n$ is a whole number greater than 50, and may be as high as several hundred to several thousand or more.

In order that those skilled in the art may better understand how the present invention may be practiced, the following examples are given by way of illustration and not by way of limitation. All parts and percents are by weight. In each example, the intrinsic viscosity obtained was determined in benzene at 25° C.

The prepolymer employed in the following examples was prepared as follows. About 500 parts phenyltrichlorosilane dissolved in 500 parts toluene were added slowly with stirring to 200 parts water. The acid layer was separated and the resin layer in a form of a toluene solution was subjected to azeotropic distillation to remove residual water and HCl. Thereafter, about 0.08 percent, by weight, KOH based on the weight of the calculated hydroxyl free phenylpolysiloxane was added, and the toluene solution was refluxed with stirring for about 9 hours to give a silanol-free phenyl prepolymer. The resulting syrupy, phenylpolysiloxane prepolymer comprising about 50.3 percent, by weight, of the toluene solution was composed of the recurring units of the formula $$C_6H_5SiO_{1.5}$$

Separation of the solid phenyl prepolymer was accomplished by diluting the above toluene solution of the phenylpolysiloxane prepolymer with about 1.5 times its weight mineral spirits (Stoddard solvent boiling approximately within the range of 156°–195° C., approximate K.B. value of 37). The resultant slurry was agitated strongly for about 10 minutes and then vacuum filtered, giving a solid prepolymer product which was air-dried for about 16 hours and then dried for 4 hours at 150° C.

EXAMPLE 1

Into each of two pressure reaction vessels having a volume of 25 ml., was placed a mixture of 0.5 gram of the prepolymer described above and about 0.005% potassium hydroxide. Thereafter, 0.2 ml. benzene was added to one vessel and to the other vessel was added 0.2 ml. of a solution consisting of about 80% by volume of benzene and 20% by volume of dimethyl sulfoxide. The reaction vessels were sealed and heated at 150° C. for 18 hours. The polymers obtained in each instance were dissolved in benzene, and the solution was acidified with an amount of acetic acid sufficient to neutralize the potassium hydroxide in the reaction mixture. The solution was then precipitated by adding an excess of methanol and the precipitated polymer was removed, filtered, and vacuum dried to give a benzene-soluble polymer having an intrinsic viscosity of 0.95 dl./g. (deciliter per gram). The polymer obtained without the addition of dimethyl sulfoxide was isolated in the same way as above and its intrinsic viscosity determined and found to be 0.15 dl./g.

EXAMPLE 2

This example illustrates the effect of varying the concentration of dimethyl sulfoxide. More particularly, 25 ml. pressure reactors were charged with 0.5 gram of the above-identified phenylpolysiloxane prepolymer containing 0.005%, by weight, potassium hydroxide. To one of these pressure reactors was added 0.2 ml. benzene. The remaining pressure reactors were charged with 0.2 ml. of a solution composed of benzene containing varying amounts of dimethyl sulfoxide, tetramethylene sulfone, tetramethylene sulfoxide and dioctyl sulfoxide. The pressure reactors were then sealed, and heated at 150° C. for 18 hours. The reactors were cooled, the contents removed, dissolved in benzene, acidified with a glacial acetic acid and precipitated in methanol as in the preceding example. After drying, the intrinsic viscosity of each of the polymers was measured. The following Table I shows the amount of benzene and organosulfur compound used in each test as well as the intrinsic viscosity obtained in each instance. Where mixtures of benzene and the organosulfur compound were used, the percents are by volume.

*Table I*

| Test No. | Solvent Added [1] | Intrinsic Viscosity [η] |
|---|---|---|
| 1 | Benzene alone | 0.26 |
| 2 | 5% dimethyl sulfoxide in benzene | 1.06 |
| 3 | 10% dimethyl sulfoxide in benzene | 0.98 |
| 4 | 20% dimethyl sulfoxide in benzene | 2.24 |
| 5 | 30% dimethyl sulfoxide in benzene | 0.58 |
| 6 | 20% tetramethylene sulfoxide in benzene | 0.80 |
| 7 | 20% tetramethylene sulfone | 0.60 |
| 8 | 20% dioctyl sulfoxide | 0.13 |

[1] 0.2 ml. total in each instance.

EXAMPLE 3

Into each of two reaction vessels was placed 5 parts of the above-mentioned prepolymer containing 0.005 percent potassium hydroxide. Thereafter 1 part diphenyl ether was added to one vessel and to the other vessel was added 1 part of a solution consisting of 80 percent, by weight, of diphenyl ether and 20 percent, by weight, of dimethylsulfoxide. The reaction vessels were each loosely stoppered and heated at 150° C. for 18 hours. The polymer obtained in each instance was dissolved in benzene, the solution was acidified with an amount of acetic acid sufficient to neutralize the potassium hydroxide in the reaction mixture, the solution was precipitated by adding an excess of methanol and the precipitated polymer was removed, filtered and vacuum-dried, all in the same manner as was done in the preceding examples. There was thus obtained in the case of the control where no dimethyl sulfoxide was used, a benzene-soluble phenylpolysiloxane having an intrinsic viscosity of 0.27 dl./g. In contrast to this, the polymer obtained in the presence of dimethyl sulfoxide had an intrinsic viscosity of 2.7 dl./g.

EXAMPLE 4

In this example, about 0.5 gram of the above-described phenyl prepolymer containing about 0.005 percent thereof KOH was placed in each of two pressure reaction vessels of about 25 ml. volume. To one reaction vessel was added 0.18 gram benzene and to the other was added 0.18 gram benzene and 0.044 gram dimethyl sulfone. Each of the vessels was then sealed and heated for 18 hours at 150° C. and the polymers isolated similarly as was done in Example 3. As a result of carrying out these tests, it was found that the polymer obtained in the absence of dimethyl sulfone had an intrinsic viscosity of 0.22 dl./g. while the phenylpolysiloxane obtained in the presence of dimethyl sulfone had an intrinsic viscosity of 1.25 dl./g.

It will of course be apparent to those skilled in the art that in addition to the above-mentioned solvents and prepolymers, other solvents and prepolymers, many examples of which have been given above and in the aforesaid Brown and Vogt patent, may be used in the practice of the present invention. Thus, one can make a prepolymer containing both silicon-bonded phenyl groups and silicon-bonded methyl groups by cohydrolyzing phenyltrichlorosilane and methyltrichlorosilane in such proportions that the methyl phenylpolysiloxane copolymer contains about 98 mol percent monophenylsiloxy units of the formula $$C_6H_5SiO_{3/2}$$

and about 2 mol percent monomethylsiloxy units of the formula $$CH_3SiO_{3/2}$$

and thereafter heating the mixture of ingredients at elevated temperatures in a suitable solvent, especially diphenyl, in the presence of a basic catalyst and organosulfur compound in the same manner as is described in the preceding examples, using initially an excess of the solvent and thereafter reducing the concentration of the solvent in accordance with Formula I and pursuant to the desired intrinsic viscosity. Instead of precopolymers containing monophenylsiloxy units and monomethylsiloxy units, one can also make precopolymers of monophenylsiloxy units and dimethylsiloxy units of the formula $$(CH_3)_2SiO$$

or diphenylsiloxy units of the formula $(C_6H_5)_2SiO$, observing the required molecular concentrations of the monophenylsiloxy units that they be at least 90 mol percent of the total molar concentration of the two organosiloxy units, and thereafter heating the precopolymer in a suitable solvent generally as above in the presence of an alkaline catalyst and the organosulfur compound.

The concentration of the organosulfur compound can be varied considerably as is recited above. Also the concentration of the solvent may be varied widely depending on the desired intrinsic viscosity taking into account in each instance Formula II for determining in advace the amount of solvent in the condensed phase which will be necessary to give the desired intrinsic viscosity. This in turn will determine the amount of excess solvent which should be removed to give the desired polymer intrinsic viscosity. The conditions of reaction, the ingredients used, including the basic catalyst which again can be employed in concentrations consistent with the desired results, can also be modified within a wide range.

The compositions prepared in accordance with the present invention have many uses. These compositions may be dissolved in solvents (in solids concentrations of from about 0.5 to 50 weight percent), for instance, benzene, and used to coat metallic conductors, to provide heat resistant insulation possessing good electrical properties. Solutions of these organopolysiloxanes can be cast on flat surfaces and the solvent evaporated to yield cohesive films which exhibit unusual heat resistance. These films can be used for many high-temperature applications, for example, as slot liners and as end turn winding insulation in motors.

Solutions of these compositions may also be applied to various textiles, particularly inorganic fibrous materials, to render the latter heat-resistant when the solvent is removed. Solutions of the organopolysiloxane compositions can be applied to adjacent surfaces, the treated surfaces pressed together, and heated to volatilize the solvent and to form a strong, heat resistant bond between the adhered surfaces.

Various fillers may be added to these compositions of intrinsic viscosity of 0.4 or higher, for instance, finely divided silicas (e.g., fume silica, silica aerogel, precipitated silica, etc.), carbon black, titanium dioxide, iron oxide, metallic pigments (for instance, finely divided aluminum powder), etc. Such pigments which may range in an amount equal to from about 0.5 to 50 percent, by weight, based on the total weight of the latter, and the polymeric compositions in which they are incorporated, are advantageously added to a solution of the polymeric compositions, and formed into, for instance, a dispersion which can be used for dipping or coating applications.

High temperature laminates may be prepared by dipping various organic and preferably inorganic porous materials such as glass wool, glass cloth, asbestos cloth, polyethylene terephthalate film, etc., in solutions of the above compositions, layers of the coated and/or impregnated materials superimposed upon each other and pressed at elevated temperatures of the order of about 200 to 350° C. at pressures ranging, for instance, from about 5 to 5,000 p.s.i. Such laminates may be in the form of panels used for electrical insulation, insulating tapes, etc., and may also be formed and used as nose cones for rockets and other projectiles which are subjected to high temperatures at supersonic speeds.

What we claim as new and desire to secure by Letters Patent of the United States is:

1. The process which comprises heating an organopolysiloxane prepolymer containing an average of from 1.0 to 1.1 silicon-bonded organic groups per silicon atom and composed of from 90 to 100 mol percent of organosiloxy units of the formula.

$$RSiO_{3/2}$$

any remaining organosiloxy units of the organopolysiloxane being selected from the class consisting of organosiloxy groups of the formula $$R'R''SiO,\ R'[CN\text{-}(CH_{2m}]SiO,\ R'''SiO_{3/2}$$

and $$CN(CH_2)_mSiO_{3/2}$$

where R is an aryl radical, R′ and R″ are selected from the class consisting of aryl radicals, alkyl radicals, alkenyl radicals, and mixtures of such radicals, R‴ is a lower alkyl radical, and *m* is a whole number equal to from 2 to 4, in the presence of a solvent for the organopolysiloxane, an alkaline rearrangement and condensation catalyst, and a minor weight proportion of an organosulfur compound selected from the class consisting of alkyl sulfoxides and alkyl sulfones in which the alkyl group contains at most four carbon atoms, the weight of the organosulfur compound being based on the weight of the prepolymer, thereby to obtain a soluble, higher molecular weight organopolysiloxane composition having an intrinsic viscosity in benzene at 25° C. of at least 0.4 deciliter per gram and which is of a higher intrinsic viscosity than the intrinsic viscosity of the prepolymer.

2. The process as in claim 1 in which the prepolymer is composed of monophenylsiloxy units of the formula $C_6H_5SiO_{3/2}$.

3. The process as in claim 1 in which the prepolymer is composed of monophenylsiloxy units of the formula $C_6H_5SiO_{3/2}$ and diphenylsiloxy units of the formula $(C_6H_5)_2SiO$.

4. The process as in claim 1 in which the prepolymer is composed of monophenylsiloxy units if the formula $C_6H_5SiO_{3/2}$ and dimethylsiloxy units of the formula $(CH_3)_2SiO$.

5. The process as in claim 1 in which the prepolymer is composed of monophenylsiloxy units of the formula $C_6H_5SiO_{3/2}$ and the solvent is benzene.

6. The process as in claim 1 in which the prepolymer is composed of monophenylsiloxy units of the formula $C_6H_5SiO_{3/2}$ and the solvent is an aromatic hydrocarbon.

7. The process which comprises heating a phenylpolysiloxane prepolymer containing an average of one phenyl group per silicon atom and composed essentially of phenylsiloxy units of the formula $C_6H_5SiO_{3/2}$ in the presence of an aromatic solvent, an alkaline rearrangement and condensation catalyst, and a minor weight proportion of dimethyl sulfoxide thereby to obtain a benzene-soluble higher mocular weight phenylpolysiloxane composition having an intrinsic viscosity in benzene at 25° C. of at least 0.4 deciliter per gram which is of a higher intrinsic viscosity than the intrinsic viscosity of the prepolymer, the weight of the dimethyl sulfoxide being based on the weight of the prepolymer.

8. The process which comprises heating a phenylpolysiloxane prepolymer containing an average of one phenyl group per silicon atom and composed essentially of phenylsiloxy units of the formula $C_6H_5SiO_{3/2}$ in the presence of an aromatic solvent, an alkaline rearrangement and condensation catalyst, and a minor weight proportion of dimethyl sulfone thereby to obtain a benzene-soluble higher molecular weight phenylpolysiloxane composition having an intrinsic viscosity in benzene at 25° C. of at least 0.4 deciliter per gram which is of a higher intrinsic viscosity than the intrinsic viscosity of the starting prepolymer, the weight of the dimethyl sulfone being based on the weight of the prepolymer.

9. The process which comprises heating a phenylpolysiloxane prepolymer containing an average of one phenyl group per silicon atom and composed essentially of phenylsiloxy units of the formula $C_6H_5SiO_{3/2}$ in the presence of an aromatic solvent, an alkaline rearrangement and condensation catalyst, and a minor weight proportion of tetramethylene sulfone thereby to obtain a benzene-soluble higher molecular weight phenylpolysiloxane composition having an intrinsic viscosity in benzene at 25° C. of at least 0.4 deciliter per gram which is of a higher intrinsic viscosity than the intrinsic viscosity of the starting prepolymer, the weight of the tretramethylene sulfone being based on the weight of the prepolymer.

10. The process which comprises heating a phenylpolysiloxane prepolymer containing an average of one phenyl group per silicon atom and composed essentially of phenylsiloxy units of the formula $C_6H_5SiO_{3/2}$ in the presence of an aromatic solvent, an alkaline rearrangement and condensation catalyst, and a minor weight proportion of tetramethylene sulfoxide thereby to obtain a benzene-soluble higher molecular weight phenylpolysiloxane composition having an intrinsic viscosity in benzene at 25° C. of at least 0.4 deciliter per gram which is of higher intrinsic viscosity than the intrinsic viscosity of the starting prepolymer, the weight of the tetramethylene sulfoxide being based on the weight of the prepolymer.

11. A composition matter comprising (1) an organopolysiloxane prepolymer containing an average of from 1.0 to 1.1 organic groups per silicon atom, the said prepolymer having an intrinsic viscosity in benzene at 25° C. of below 0.4 deciliter per gram and composed of from 90 to 100 mol percent of organosiloxy units of the formula $$RSiO_{3/2}$$

any remaining organosiloxy units of the organopolysiloxane being selected from the class consisting of organosiloxy groups of the formula $$R'R''SiO,\ R'[CN\text{—}(CH_2)_m]SiO,\ R'''SiO_{3/2}$$

and $$CN(CH_2)_mSiO_{3/2}$$

where R is an aryl radical, R′ and R″ are selected from the class consisting of aryl radicals, alkyl radicals, alkenyl radicals, and mixtures of such radicals, R‴ is a lower alkyl radical, and *m* is a whole number equal to from 2 to 4, a solvent for the organopolysiloxane, an alkaline rearrangement and condensation catalyst, and from 0.5 to 30 percent by weight, of an organosulfur compound selected from the class consisting of alkyl sulfoxides and alkyl sulfones in which the alkyl group contains at most four carbon atoms, the weight of the organosulfur compound being based on the weight of the prepolymer.

12. A composition matter comprising a prepolymer having an average of one phenyl group per silicon atom, the said prepolymer having an intrinsic viscosity in benzene at 25° C. below 0.4 deciliter per gram and composed of monophenylsiloxy units of the formula $C_6H_5SiO_{3/2}$, an alkaline rearrangement and condensation catalyst, an aromatic solvent, and from 0.5 to 30 percent, by weight of dimethyl sulfoxide, based on the weight of the prepolymer.

13. A composition matter comprising a prepolymer containing one phenyl group per silicon atom, the said prepolymer having an intrinsic viscosity in benzene at 25° C. below 0.4 deciliter per gram composed of monophenylsiloxy units of the formula $C_6H_5SiO_{3/2}$, an alkaline rearrangement and condensation catalyst, an aromatic solvent, and from 0.5 to 30 percent by weight, of dimethyl sulfone, based on the weight of the prepolymer.

14. A composition matter comprising a prepolymer containing one phenyl group per silicon atom, the said prepolymer having an intrinsic viscosity in benzene at 25° C. below 0.4 deciliter per gram composed of monophenylsiloxy units of the formula $C_6H_5SiO_{3/2}$, an alkaline rearrangement and condensation catalyst, an aromatic solvent, and 0.5 to 30 percent by weight, of tetramethylene sulfone, based on the weight of the prepolymer.

15. A composition matter comprising a prepolymer containing one phenyl group per silicon atom, the said prepolymer having an intrinsic viscosity in benzene at 25° C. below 0.4 deciliter per gram and composed of monophenylsiloxy units of the formula $C_6H_5SiO_{3/2}$, an alkaline rearrangement and condensation catalyst, an aromatic solvent, and from 0.5 to 30 percent, by weight, of tetramethylene sulfoxide, based on the weight of the prepolymer.

References Cited by the Examiner

UNITED STATES PATENTS

| | | | |
|---|---|---|---|
| 2,833,801 | 5/58 | Holbrook | 260—46.5 |
| 2,877,211 | 3/59 | Nitzsche et al. | 260—46.5 |
| 2,997,457 | 8/61 | Kantor | 260—46.5 |
| 3,017,386 | 1/62 | Brown et al. | 260—46.5 |
| 3,050,485 | 8/62 | Nitzsche et al. | 260—46.5 |

MURRAY TILLMAN, *Primary Examiner.*

J. R. LIBERMAN, *Examiner.*